United States Patent [19]
Yager

[11] 3,840,417
[45] Oct. 8, 1974

[54] PROCESS FOR PRODUCING DIMPLED REFLECTORS AND REFRACTORS

[75] Inventor: William Clausen Yager, Blue Bell, Pa.

[73] Assignee: General Electric Company, Philadelphia, Pa.

[22] Filed: Feb. 15, 1972

[21] Appl. No.: 226,465

[52] U.S. Cl.............. 156/242, 156/245, 156/285, 156/288, 156/289, 264/1
[51] Int. Cl. ............................................ B29c 3/00
[58] Field of Search ........... 156/242, 245, 246, 285, 156/290, 252, 247, 289, 288; 264/1

[56] References Cited
UNITED STATES PATENTS
3,064,401  11/1962  Mooney .................................. 264/1

3,322,598  5/1967  Marks et al. ........................ 156/285
3,582,424  6/1971  Noruaise .............................. 156/245

Primary Examiner—Alfred L. Leavitt
Assistant Examiner—Caleb Weston

[57] ABSTRACT

A process and apparatus for producing reflectors or refractors having an array of regularly spaced, uniform microscopic mirrors or lenses. The process is comprised of placing on a mold surface two layers of thin flexible sheets with a layer of cement therebetween, placing a perforated sheet of material adjacent one of the films and applying pressure to the perforated sheet to develop hydrostatic pressure within the cement which forces the film and cement to form dimples which extend into the perforations.

5 Claims, 4 Drawing Figures

PATENTED OCT 8 1974 3,840,417

3,840,417

PROCESS FOR PRODUCING DIMPLED REFLECTORS AND REFRACTORS

BACKGROUND OF THE INVENTION

The subject invention relates to the field of optical elements and, in particular, to a process and apparatus for producing optical reflectors and refractors.

In certain technical applications of motion picture, television, or still photographic projection it is required to display a high brightness, real image to a limited audience, possibly only to a single individual. In some of these applications high brightness with practical, economical light sources may be the primary goal. Examples of these applications include microfilm readers, audiovisual products intended for use in ambient light, and visual flight and driving simulators. In other applications it may be desired to limit the viewing area for purposes of focusing attention or eliminating distraction, to heighten the entertainment value of the presentation, or privacy. Examples of these applications include phone-vision displays, museum or industrial displays, teaching machines and educational testing devices. In still other applications uniformity of brightness over a limited viewing area may be the desired goal, as for example in movie editors.

In principle, a real aerial image can be viewed directly by a suitably positioned observer without the intervention of any form of screen or field element. Under such circumstances, the scene brightness may be at a maximum, but the field of view will be extremely limited for any given observer eye position. The field of view can be greatly enlarged without loss of brightness by placing a non-diffusing field element, such as a lens, at or near the aerial image, but the viewing area will be severely limited unless the pupil of the projection lens is large. To enlarge the viewing area without employing large and expensive projection optics, a diffusion element of some form is conveniently introduced at the real image position. This diffusion element enlarges the solid angle of radiation associated with an image element, thereby increasing the viewing area. This increase in viewing area is obtained at the cost of reduced brightness, however, since an increase in solid angle of radiation from an image element without a corresponding increase in the total light flux radiated by definition entails reduced brightness.

In applications involving high brightness imagery and a limited viewing area, it is generally the goal of the designer to place at the image a diffusor or other means to increase the solid angle of radiation so as to expand the viewing area to just that size desired and to illuminate the viewing area uniformly. Most diffusing screens employed in commercial display devices exhibit a random microstructure. Ground glass is one example. Randomly structured material such as this are used chiefly because they are inexpensive to produce. They do enlarge the viewing area, as required, but they are not susceptible to close manufacturing control and are inherently unable to illuminate that viewing area uniformly. To achieve the desired combination of limited viewing area and uniform illumination over that viewing area, a screen with some kind of regular microstructure is required. Such screens are sometimes called semispecular screens. One example is a dimpled mirror.

A dimpled mirror display screen is basically a large spherical mirror whose surface is impressed with a regular array of small spherical depressions, individually too small to be resolved by the viewer. The focal length of the dimple is chosen to be very much less than that of the main spherical mirror. Each dimple consequently forms near its focus a much demagnified image of the projection lens pupil, and all light falling on the dimple passes through that image on its way to the viewer. If the projection lens pupil is small, the image of that pupil is very small, and the effective exit pupil of the display, at the viewers position, is a point projection of the dimple itself. If the size of the dimple is no greater than one-half the size of an image resolution element, substantially uniform illumination is produced over the effective exit pupil at the viewer's position.

The principle of the dimpled mirror is also applicable to rear projection screens. Control over exit pupil similar to that discussed in regard to dimpled mirrors can be effected by a combination of refractive lens elements, such as fresnel lenses, and a molded array of microscopic lenses. The merits of such a design have long been realized, and such screens have been fabricated in the past for display applications.

Difficulty lies in devising a practical method of manufacture capable of producing dimpled mirrors or lens arrays at a cost consistent with the application. When costs permit, dimpled mirrors can be produced in small quantities by simple machine methods. For example, dimpled mirrors have been produced by indenting a metal mirror with a ball bearing stepped at small regular intervals by an indexing table. Such mirrors can be replicated in quantity by electroforming or by plastic molding, but these processes are quite expensive for large arrays. Also, etching has been used to produce dimpled mirror surfaces. Many attempts have been made in the industry to produce screens with some kind of regular microstructure by a process lending itself to at least medium scale production. Beaded screens are one such product, but have the disadvantage that only very small radii of curvature can be employed. Such screens are not suited to high brightness, limited viewing area applications. Lenticular screens and others employing rolled or embossed metal foil are difficult to produce with the satisfactory degree of dimensional control and are also unsuitable for limited viewing area applications. What has been needed is a process of manufacture which is capable of close dimensional control but which is simple, inexpensive, and suitable for at least moderately high production rates and for the production of physically large screens.

SUMMARY OF THE INVENTION

Thus, it is an object of the subject invention to provide a process and apparatus for producing dimpled reflectors or refractors formed of an array of small optical elements accurately positioned and dimensioned.

Another object of the subject invention is to provide a process and apparatus for producing dimpled reflectors or refractors at a reasonable cost and at reasonably high production rates.

Another object of the subject invention is to provide a process and apparatus for producing physically large dimpled reflectors or refractors.

The above-mentioned objects are satisfied in the subject invention by providing a process (and apparatus for performing the process) comprised of placing two layers of thin sheet material with a supply of a low-viscosity cement therebetween into a mold conforming to the general shape required of the array, placing a sheet of very thin perforated material with regularly spaced apertures therein the size of the dimples desired onto the outer surface of one of the sheets and applying pressure to the perforated material for a period of time sufficient to allow the cement to set or harden.

The subject matter which is regarded as the present invention is particularly pointed out and distinctly claimed in the concluding portion of this specification.

BRIEF DESCRIPTION OF THE DRAWINGS

The present invention, however, both as to organization and method of operation, together with further objects and advantages thereof, may best be understood by reference to the following description taken in connection with accompanying drawings in which.

DESCRIPTION OF THE PREFERRED EMBODIMENTS

Figure 1:
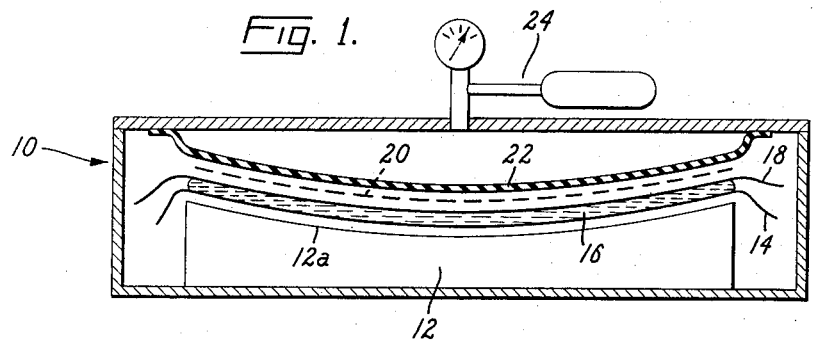
FIG. 1 is a cross-sectional view of an apparatus for performing the process of the subject invention.

The subject invention involves a process and apparatus 10 for producing a close array of very small, uniform convex spherical mirrors or lenses of controllable radius of curvature. The apparatus shown in FIG. 1 is set up for producing a concave spherical array of convex spherical mirrors or lenses and is comprised of a mold 12 having a generally smooth mold surface 12a conforming to the concave shape desired for the array; a first sheet 14 of a thin, flexible film such as a plastic which is placed on the mold surface 12a; a layer of a low-viscosity cement 16 which is applied to sheet 14; a second thin sheet 18 of a flexible film which is placed on top of the layer of cement 16; a sheet of very thin perforated material 20 with close-packed, regularly spaced holes the size of the dimples desired which is placed on top of sheet 18; an inflatable bladder 22 having a size exceeding that of the perforated material 20 which is disposed adjacent perforated material 20; and means 24 for inflating bladder 22 and maintaining a predetermined pressure therein so as to provide a substantially uniform pressure on perforated material 20.

In operation, the process of the subject invention is comprised of lightly stretching sheet 14 over mold surface 12a; applying a layer of cement 16; stretching and laying second sheet 18 over cement layer 16 to form a sandwich of the two sheets with cement therebetween; laying perforated material 20 adjacent the sandwiched layers and applying a predetermined pressure to the layers by inflating the bladder. The pressure exerted by the inflated bladder forces the assembly into the general shape provided by the mold and causes hydrostatic pressure to develop in the cement between sheets 14 & 18.

Figure 2:
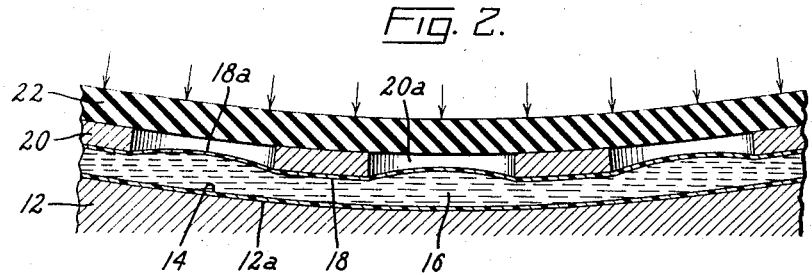
FIG. 2 is an enlarged cross-sectional view showing the formation of dimpled optical surfaces in accordance with the subject invention.

It is well known that a stretched circular membrane under hydrostatic pressure will deform into a spherical shape. Therefore, as shown in FIG. 2, the portions 18a of sheet 18 within holes 20a will be forced to assume a generally spherical, dimpled shape. The pressure applied by bladder 22 is maintained until the cement sets. While the radius of curvature of each spherical dimple is dependent on many factors such as hole size, sheet thickness, physical properties of the sheet, etc., for a given set of circumstances it is entirely a function of pressure. The correct correlation between pressure and radius of curvature for given materials is preferably found by experimentation. If the optical member is to be a mirror, a number of alternatives may be employed to provide a reflective surface therefor. For example, the material used for sheet 18 may have a metallized layer thereon. Alternatively, the outer surface of sheet 18 may be metallized after the optical member has been formed. Conventional metallizing processes may be used to either coat the entire optical surface of sheet 18 or, by maintaining perforated material 20 in place, selectively metallize the dimpled surfaces 18a on the member.

Figure 3:
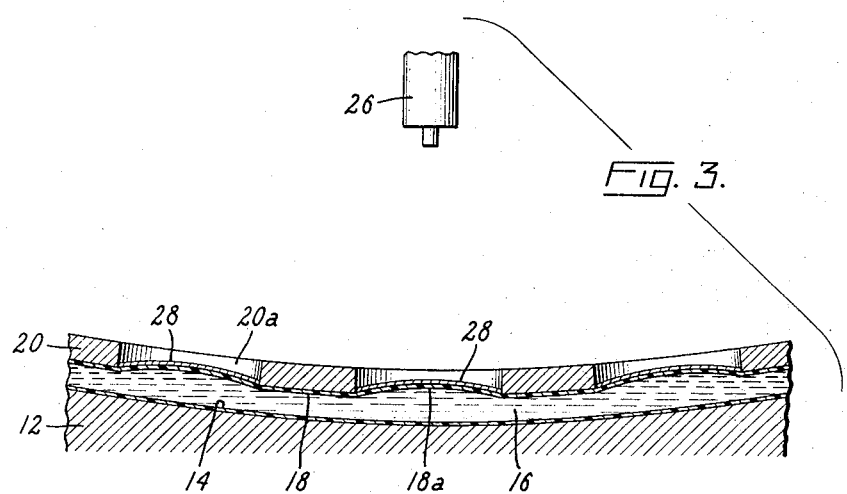
FIG. 3 is a partial cross-sectional view of an apparatus for metallizing a dimpled mirror in accordance with the subject invention.

In FIG. 3 apparatus for metallizing the dimpled surfaces of an optical member formed in accordance with the subject invention is shown. The apparatus consists of a metallizing spray gun 26 which deposits a metallic layer 28 on the portions 18a of sheet 18 which have been deformed into the spherical, dimpled shape.

After an optical member is removed from the mold and metallized, if necessary, a support member may be attached to the side of the member not having the optical surface such as by cementing a substrate thereon or spraying a structural material such as plastic onto the surface.

Figure 4:
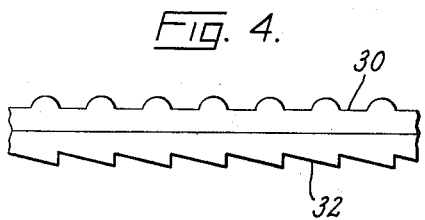
FIG. 4 is a cross-sectional view of a dimpled refractor formed in accordance with the subject invention.

If a refractive optical member, i.e., an array of small lenses, is desired, a similar process and apparatus may be utilized. The major difference from a material standpoint is that an optical cement which is both transparent and non-adherent to sheets 14 and 18 must be utilized. Using this type of cement the optical member with its dimpled spherical surfaces is formed in accordance with the process which has been described above. After the cement has set, the optical member is removed from the mold and the non-adhering sheets stripped away. The result is a free-standing refractive optical member comprised of a regular array of uniform microscopic lenslets of known properties. Generally, such a member 30 would be most likely cemented to a field element substrate 32, such as a fresnel lens, as shown in FIG. 4.

Substantially any shape mold may be used, for example planar, spherical, cylindrical or irregularly shaped. The surface of the mold is preferably smooth although it may have minor irregularities or be textured depending on any specific requirements for the back surface of the optical member to be formed. The material used for the sheet on which the dimples will be formed, i.e., the second sheet, is preferably thin, flexible and somewhat elastic so that it can be made to conform to the mold and be deformed to the dimpled shape desired. The requirements for the first sheet are, of course, less critical than those for the second sheet although, the same material may be used for both. Thin plastic films are generally suitable for these purposes. Mylar plastic film is quite acceptable and is readily available in a number of different thicknesses and in transparent as well as metallized versions. Particularly, quarter-mil clear and metallized Mylar film has been found to work quite acceptably as a second sheet. Rigid as well as flexible materials and materials of substantial thickness may be used for the first sheet as long as they conform to the shape of the mold or can be made to conform thereto.

In the reflector producing process, substantially any low-viscosity cement including casting plastics or similar cold-setting materials may be used. It is of course preferable that the cement by quick-setting to minimize the amount of time necessary to maintain the components of the optical member under pressure. In the production of dimpled refractors, a transparent low-viscosity cement which will not adhere to the sheet material utilized, such as a commercially available optical cement, may be utilized.

The perforated material utilized preferably should have a regular array of accurate holes therein, should be flexible so that it can conform to the gross shape of the mold but should not be otherwise deformable under the pressure imposed thereon. Electroformed metal meshes are excellent for this purpose in that they possess these characteristics and are also inexpensive and readily available in large sheets. While it is preferable that the holes therein be circular, as only circular holes will yield truly spherical dimples, other shaped holes, such as hexagonal or octagonal may be used.

Also, other means for applying pressure to the layers of materials used may be employed other than the inflatable bladder shown in FIGS. 1 and 2. For example, pressure could be applied by a press which makes substantially uniform contact with the materials or by a weighted member. These latter two examples would be primarily useful for producing planar optical members, although they could be adapted for use in producing optical members of other shapes. The pressure producing means should provide a uniform pressure acting on the layers of materials.

While in FIGS. 1 and 2 the pressure producing means is shown as contacting and acting directly on the perforated material. It is also effective to have the perforated material contact the mold surface 12a and have the pressure producing means acting on the first sheet 14. Also, both sides of the optical member can have dimpled surfaces formed thereon simultaneously by placing perforated material on both the first and second sheets before pressure is applied thereto. In this way, an optical member having a dimpled mirror surface on both sides or having lenslets on both sides can be formed. Additionally, other surface treatments can be applied to introduce secondary effects. For example, the mold surface or a layer on top of the mold surface would be textured so as to form a fresnel lens surface on one side of the optical member. Also, various coatings in addition to or in place of the metallized coating can be applied to one or both of the surfaces of the optical member formed to produce desired optical effects. This could include a transparent plastic colored coating which would provide a filtering effect.

Thus, the subject invention provides a process (and apparatus for performing the process) which accomplishes simply, automatically, and economically an otherwise extremely costly process of fabrication of dimpled optical reflectors and refractors utilizing the stable and predictable physical process of spherical deformation of membranes under hydrostatic pressure.

It is understood that many modifications may be made to the subject invention, in addition to those described above, which fall within the true scope and spirit of the subject invention. Therefore, the scope of the subject invention is intended to be limited only by the recitation of the appended claims.

What is claimed as new and desired to be secured by Letters Patent of the United States is:

1. A process for producing an optical member having regularly spaced, dimpled optical surfaces comprised of the steps of:
   1. placing in a mold having the general shape of the desired overall shape of the optical member;
      a. a first sheet of plastic film conformable to the shape of the mold,
      b. a layer of low-viscosity cement on one side of said first sheet,
      c. a second sheet of plastic film placed on top of said cement layer, and
      d. a sheet of perforated material having regularly spaced holes therethrough placed on the exposed side of said second sheet;
   2. applying substantially uniform pressure to the layers of materials on the mold for a period of time sufficient to allow the cement to set; and
   3. removing said sheet of perforated material.

2. A process as in claim 1 wherein said layer of cement is applied by spraying.

3. A process as in claim 1 wherein said second sheet has a metallized surface.

4. A process as in claim 1 further including the step of metallizing at least a portion of the surface of said second sheet.

5. A process as in claim 1 wherein said pressure is applied by inflating a bladder contiguous to the surface of said perforated material.

* * * * *